United States Patent [19]

Ishii

[11] Patent Number: 5,127,035
[45] Date of Patent: Jun. 30, 1992

[54] PULSE COUNTER CIRCUIT AND DISPLACEMENT MEASURING DEVICE

[75] Inventor: Satoshi Ishii, Tokyo, Japan

[73] Assignee: Canon Kabushiki Kaisha, Tokyo, Japan

[21] Appl. No.: 589,264

[22] Filed: Sep. 28, 1990

[30] Foreign Application Priority Data

Sep. 29, 1989 [JP] Japan .................. 1-255518

[51] Int. Cl.$^5$ .................. G05B 19/18; G06M 3/08; H03K 21/40
[52] U.S. Cl. .................. 377/24; 324/115; 377/44; 377/17; 377/28; 250/231.13
[58] Field of Search .......... 377/17, 24, 10, 20, 377/44, 28; 324/78 D, 115; 250/231.13

[56] References Cited

U.S. PATENT DOCUMENTS

| | | | |
|---|---|---|---|
| 3,993,984 | 11/1976 | Penrod | 324/78 D |
| 4,150,282 | 4/1979 | Aoki et al. | 377/24 |
| 4,203,063 | 5/1980 | Loed et al. | 324/115 |
| 4,468,796 | 8/1984 | Suga | 377/28 |
| 4,528,682 | 7/1985 | Nakauki | 377/44 |
| 4,628,269 | 12/1986 | Hunninghaus et al. | 328/140 |
| 4,839,834 | 6/1989 | Omae et al. | 377/20 |
| 4,912,320 | 3/1990 | Ishii et al. | 250/231.13 |
| 4,930,895 | 6/1990 | Nishimura et al. | 356/356 |
| 4,933,673 | 6/1990 | Ishizuka et al. | 341/13 |
| 4,970,388 | 11/1990 | Nishimura et al. | 250/237 G |
| 4,979,826 | 12/1990 | Ishizuka et al. | 356/356 |
| 4,982,413 | 1/1991 | Hauck et al. | 377/17 |

Primary Examiner—John S. Heyman
Attorney, Agent, or Firm—Fitzpartrick, Cellar, Harper & Scinto

[57] ABSTRACT

Disclosed is a pulse counting circuit for counting pulse signals comprising a first pulse signal generating means for generating a first pulse signal corresponding to an input signal, a counting means for counting at least either of said first pulse signal and a second pulse signal which differ from said first pulse signal corresponding to said input signal, said first pulse signal possessing a pitch set smaller than that of said second pulse signal, and a control means for selectively controlling the operation of said count means for counting said first and second pulse signal.

25 Claims, 11 Drawing Sheets

PULSE COUNTER CIRCUIT AND DISPLACEMENT MEASURING DEVICE

BACKGROUND OF THE INVENTION

1. Field of the Invention

This invention relates to a pulse counter circuit and a displacement measuring device employing this pulse counter circuit. The present invention are ideally usable, for example, on incremental-type rotary encoders or linear encoders.

2. Related Background Art

Conventionally, on magnetic or optical incremantal-type rotary encoders or linear encoders, displacement amounts of movable scales, shift directions, and others are detected by using two types of sinusoidal wave signals (2-phase sinusoidal wave signals) having mutually different phases and obtainable from two sensors. On linear encoders, for instance, it is known that signal insertion circuits are adapted to improve the resolution of position detection of linear scales. From the above-mentioned 2-phase sinusoidal wave signals, a plural number of sinusoidal wave signals mutually possessing phase differences are generated and based on these sinusoidal wave signals, a plural number of divided pulse signals are formed.

FIG. 1 is a block diagram showing an example signal insertion circuit. The components indicated with the numerals of 1 and 2 in this figure are input terminals. For example, input into these terminals are sinusoidal wave signals with mutually differing phases that are output from two sensors of a linear encoder. For instance, while signal "a" is input into input terminal 1, what is input into input terminal 2 is signal "b" possessing 90-degree phase difference from signal "a". Also, by inputting signal "a" into reverse circuit 3, signal "c" possessing 180-degree phase difference from signal "a" can be obtained. Then, by appropriately weighting these three types of sinusoidal signals "a", "b", and "c" with resistance and others, sinusoidal wave signals with optional angles (phase angles) are inserted. In this FIG. 1, the same values for resistance R are used to thereby obtain signals "d" and "e" with phase differences of 45 degrees and 135 degrees, respectively. These signals "d", "b", and "e" are converted to rectangular wave signals (binary signals) "f", "g", "h", and "i" by means of respectively corresponding comparator 4,5,6, and 7. The signals are then output in the form of a pulse train by direction discriminator 8. The pulses forming this pulse train are generally termed up-down pulses. Depending on phase relations between signals "a" and "b" (which is leading), these up-down pulses are divided into up pulse "j" or down pulse "k". In this manner, since original signal "a" (or "b") is subjected to multiple division, the resolution for angle detection can be upgraded. Shown in FIG. 2 are the waveform examples of signals "f" through "k" mentioned in connection with FIG. 1. In this case, pulse signal "j" ("k" during reverse rotation) is obtained with 8 division of one cycle of rectangular wave signal "f" (or "h") corresponding to input signal "a" (or "b"). By counting of these up-down pulses (divided pulses) "j" and "k", scale positions are detected.

However, when the linear scale shift speed is accelerated, frequencies of sinusoidal wave signals input into input terminals 1 and 2 are increased. It was found that as a result of this frequency rise, there occur cases where accurate measurement of linear scale displacement is not possible while the signal insertion circuit fails to follow those high-frequency signals and to correctly generate divided pulses.

SUMMARY OF THE INVENTION

A prime object of the subject invention lies in providing an improved pulse counter circuit capable of eliminating the above-mentioned problems.

A secondary object of this invention is to provide a displacement measuring device equipped with a improved pulse counter circuit that can solve abovementioned problems.

Other purposes of the present invention will be clarified in the detailed description of the embodiments according to the present invention.

DESCRIPTION OF THE PREFERRED EMBODIMENTS

Figure 1:
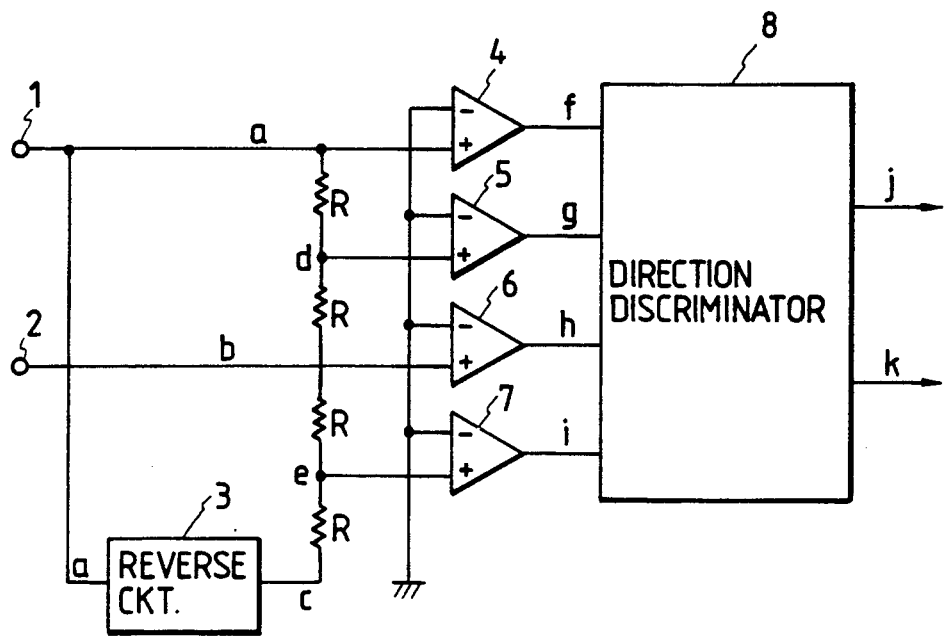
FIGS. 1 and 2 are the explanatory diagrams with regard to the prior art.
Figure 2:
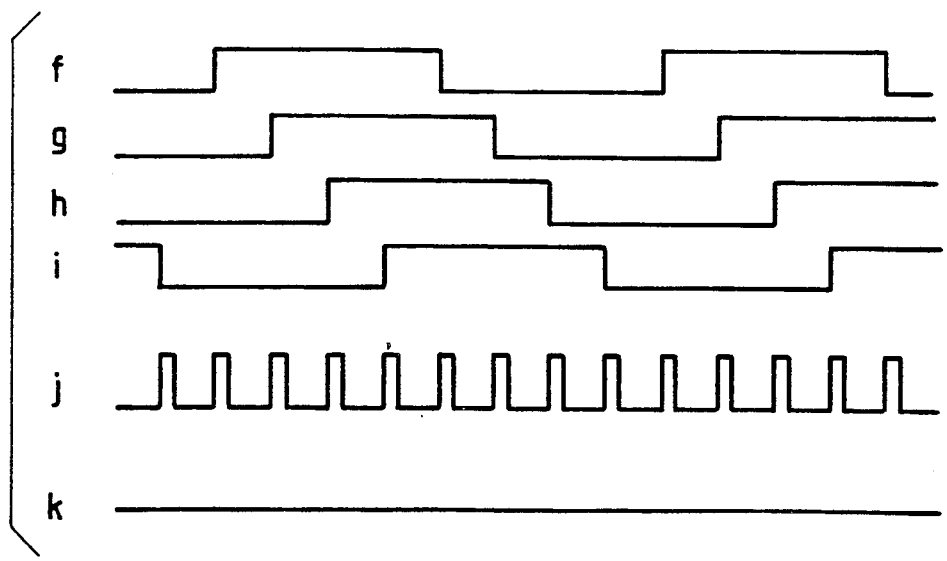
Figure 3:
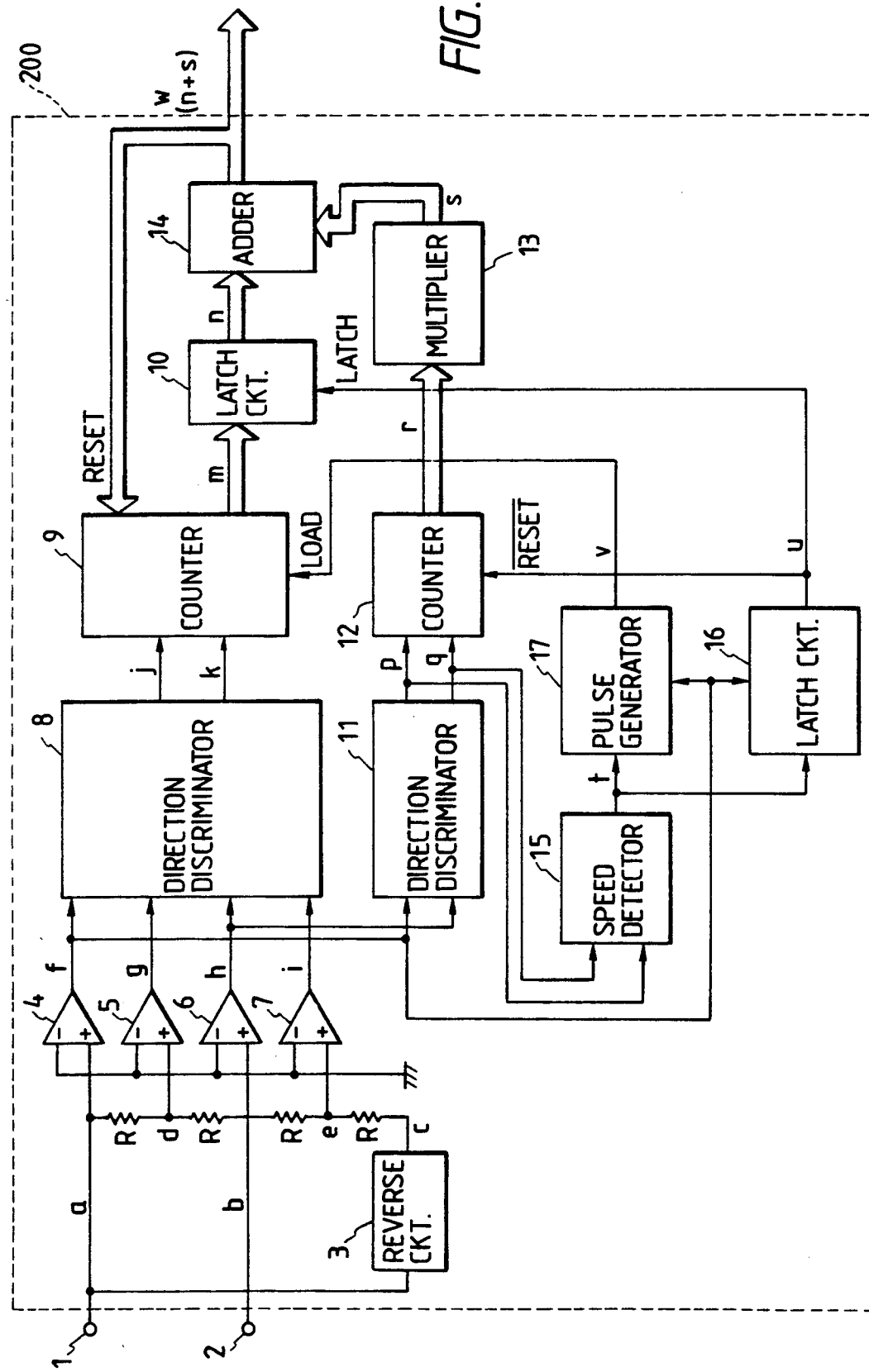
FIG. 3 is a block diagram of signal insertion circuit of the first embodiments according to the present invention.

FIG. 3 is a block diagram showing a signal insertion circuit used for the first embodiment of this invention. Similarly to FIG. 1, this signal insertion circuit is mounted on a linear encoder. On those components in this FIG. 3 which are identical with those shown in FIG. 1, the same identification symbols are affixed and the explanations of these components are omitted. The reference numeral 9 is a counter which counts up-down pulses "j" and "k" sent from a direction discriminator 8 and outputs count data "m". The numeral 10 is a temporary data retention circuit for a latch circuit and others. This circuit latches count data "m" obtained from counter 9 and outputs the latched value as data "n". Data latching is conducted by a pulse signal "u" described later.

The reference numeral 11 is a direction discriminator configured in the same way as the direction discriminator 8. This discriminator generates up-down pulses "p" and "q" which are equivalent to signals "a" and "b" and are corresponding to signals "f" and "h" before splitting. Another counter 12 counts up-down pulses "p" and "q" and outputs count data "r" similarly to the counter 9. The reference numeral 13 is a multiplication circuit or a multiplier and this multiplier outputs data "s". In this case, data "s" represents the value obtained by multiplying count data "r" with value "N" which is equivalent to the ratios between resolutions (frequencies) of up-down pulses "p" and "q" and up-down pulses "j" and "k". In the example shown in FIG. 3, the value of "N" becomes 2 because pulses "p" and "q" are obtained by dividing input signals in four while "j" and "k" are obtained by dividing input signals in eight.

The reference numeral 14 is an adder that perform addition of data "n" and data "s" and issues the resultant (n+s) value as data "w". This circuit also inputs data "w" into the preset data input terminal of counter 9. The numeral 15 is a speed detecting circuit. As for the example in FIG. 3, this speed detector detects pulse intervals or frequencies of up-down pulses "p" and "q" and issues detection output "t" corresponding to linear scale speed in the form of logical signals. The numeral 16 is a latch circuit and this circuit latches signal "t" at the rise edge of signal "f" to output as logical signal "u". This signal "u" is used as a latch signal for temporary data retention circuit 10 and also as a reset signal (negative logic) for counter 12. The numeral 17 is a pulse generator for generating pulse signal "v" when logical signal "u" is reversed. This pulse signal "v" is used for loading of preset data of counter 9. All such component circuits mentioned above constitute signal insertion circuit 200.

Figure 4:
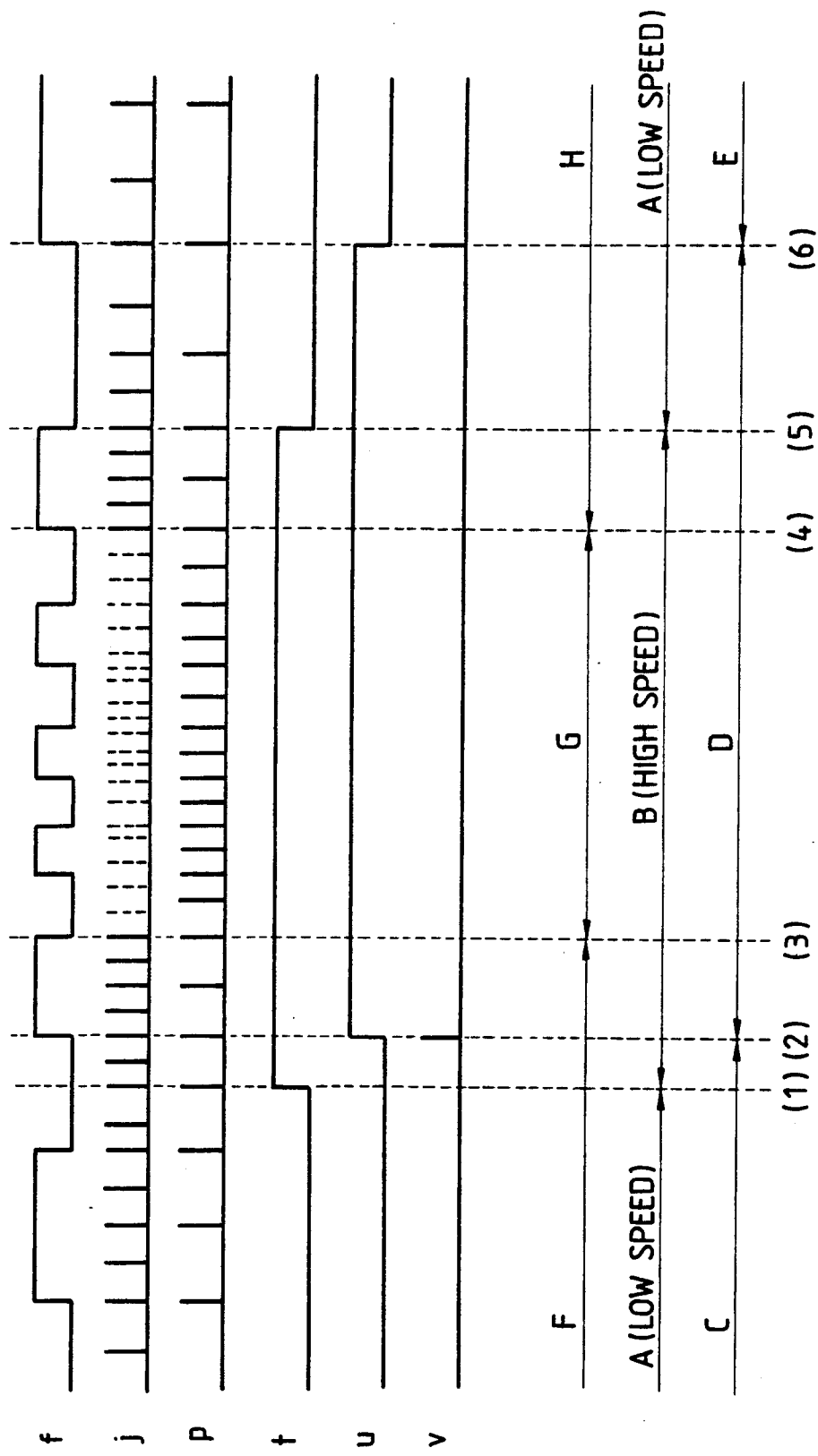
FIG. 4 is a time chart showing waveform for the same embodiment.

With reference to the signal waveform examples shown in FIG. 4, the operation of the circuits in FIG. 3 will be explained. FIG. 4 shows an example case where a moving object, namely, the linear scale, is first gradually accelerated in its speed and then gradually decelerated. Therefore, it is observable that frequencies of signals "f", "j", and "p" are lowered after once raised. Division means (1-8) cannot follow signal "j" subjected to 8 division at the high-frequency portion resulting in creating unreliable status in the area between (3) and (4) of FIG. 4 (range G). On the other hand, in a speed detection circuit 15, such configurations are adapted to enable judging that scale shift is at high speed long before signal "j" becomes unable to follow. Output signal "t" as shown in FIG. 4 can be obtained because circuit 15 judges existence of low speed before (1) as well as after (5) (range A) and of high speed between (1) and (5) (range B). FIG. 4 also shows the types of waveforms for pulse signal "v" and signal "u" obtained by latching signal "t" at the rise of signal "f". The reference numeral (2) represents a position where signal "f" rises for the first time after signal "t" becomes "high" and this is also the point where signal "u" is converted to a "high". The numeral (6) is a point where signal "g" rises for the first time after signal "t" becomes "low" and signal "u" is changed to "low".

In a range C in FIG. 4, a counter 9 continues counting of pulse "j" in normal manner and keeps outputting the counting results as signal "m". A temporary data retention circuit 10 remains in the state of letting count data "m" as output data "n" because signal "u" is at "low". During this time, on the other hand, a counter 12 is under reset state and output "r" is maintained at zero level, consequently causing data "s" to stay at zero output condition. As a result, the addition result "w" at an adder 14 is equal to the count data "m". In other words, it is evident that counting results of signal "j" (up-down pulse) obtained by division are output as they are.

At a point (2) in FIG. 4, concurrently with rise of signal "u" and counting start by counter 12, a temporary data retention circuit 10 is latched. This temporary data retention circuit 10 retains the value of count data "m" available immediately before latching (retention value M) and outputs this value as data "n". Since signal "v" is simultaneously generated at this time, preset data "w=n+s"(value M) is loaded on counter 9. In range D starting from this point, the value of data "n" remains as that of M. Instead, count data "r" as well as count data "s" obtained by N-time multiplication of "r" are changed and output "w" from adder 14 is also changed according to changes of "r" and "s". Therefore, from point (2) in FIG. 4 and thereafter, obtained as output signal "w" are the values obtained by adding the retention value M to the data "s" collected from counting signal "p".

At the portion between (3) and (4) in FIG. 4, signal "j" obtained by division becomes unreliable. During this period, however, by counting signal "p" corresponding to signal "f" (namely, signal "a") generated from output "w" is the value with data "s" added to retention value M. In this case, at the time when signal "p" is input, accurate values with high-level resolution are obtainable.

At point (5) in FIG. 4, signal "t" becomes "low". However, at this point, the above-mentioned operation is continued and signal "j" is not utilized.

When it comes to point (6) in FIG. 4, the output signal "w" available at this point is preset on the counter 9 by pulse signal "v". ("w" becomes accurate value at this point). At the same time, since signal "u" becomes "low", the temporary data retention circuit 10 discontinues the retention and starts output of input signals as such. Also, the counter 12 is reset and data "r" and "s" become zero. Namely, from this point on, counting is resumed by using signal "j" obtained through division from preset correct values.

Figure 5:
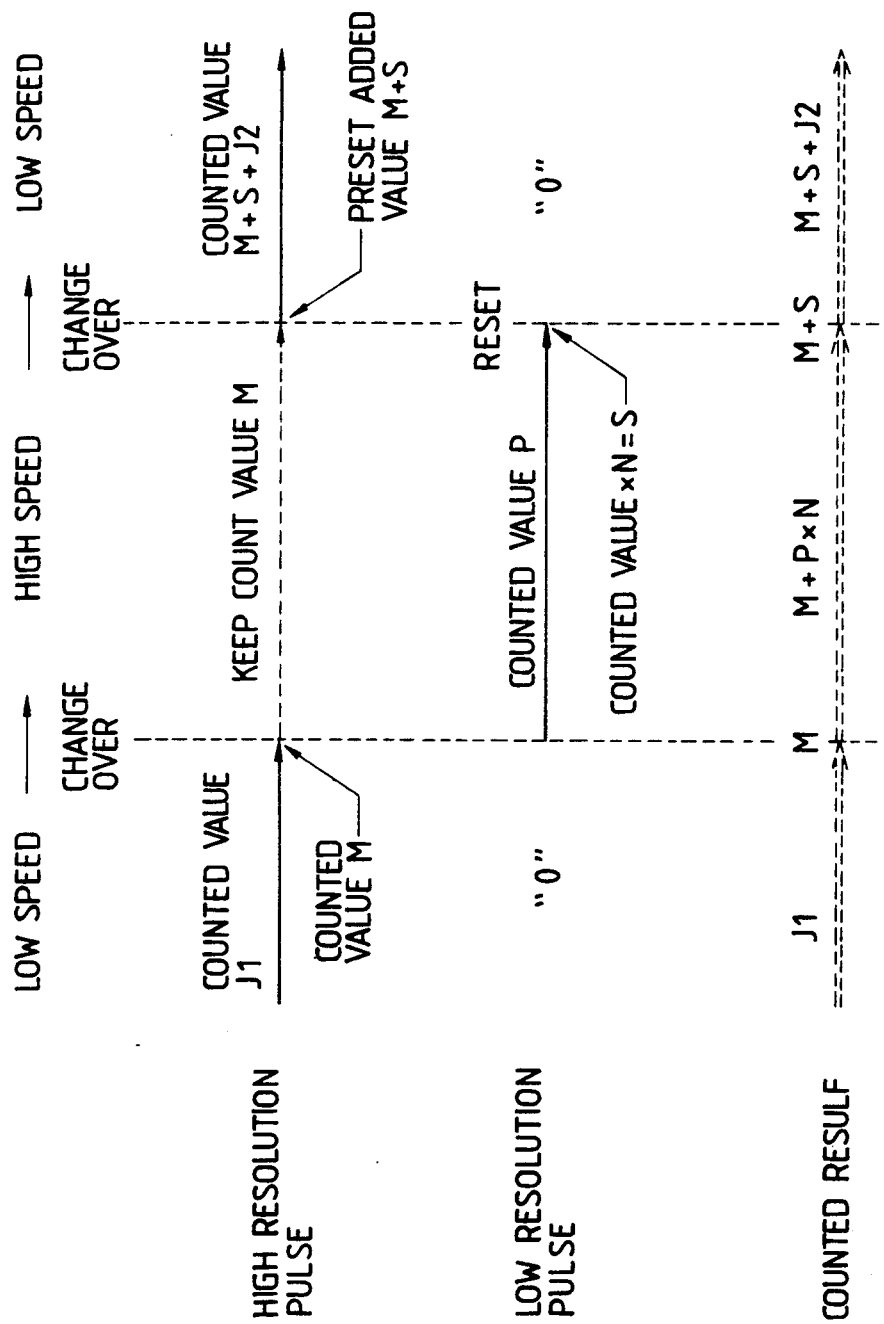
FIG. 5 is a conceptional diagram of operation of the same embodiment.

FIG. 5 illustrates the conceptional summary of the above-mentioned circuit operation. Pertaining to this FIG. 5, high-frequency narrow pitch signals corresponding to up-down pulses "j" and "k" after the above-mentioned division are termed high resolution pulses. On the other hand, low-frequency (wide-pitch) signals corresponding to up-down pulses "p" and "q" before the said division are termed low resolution pulses. In this example too, assumed is the case where shift of a moving object is first changed from low speed to high speed and then returned to low speed again.

During low-speed shift, low resolution pulses remain reset and count results J1 of high resolution pulses are output. When speed becomes high, counting of high resolution pulses is stopped and count value M during change-over time is held. Simultaneously, counting of low resolution pulses is started and output is made of the value with hold value M added to the value with resolution ratio N multiplied to count value P. When speed drops to the level judged to be low speed, counting of low resolution pulses is reset. At the same time, addition results S (M+P×N immediately before resetting) are preset on the counter of high resolution pulses (counter 12 shown in FIG. 1). From this point on, counting of high resolution pulses is resumed.

As explained above, by counting up-down pulses before division during low speed and by counting up-down pulses after division during high speed, the encoders with high-level resolution and high-speed response can be realized.

Figure 6:
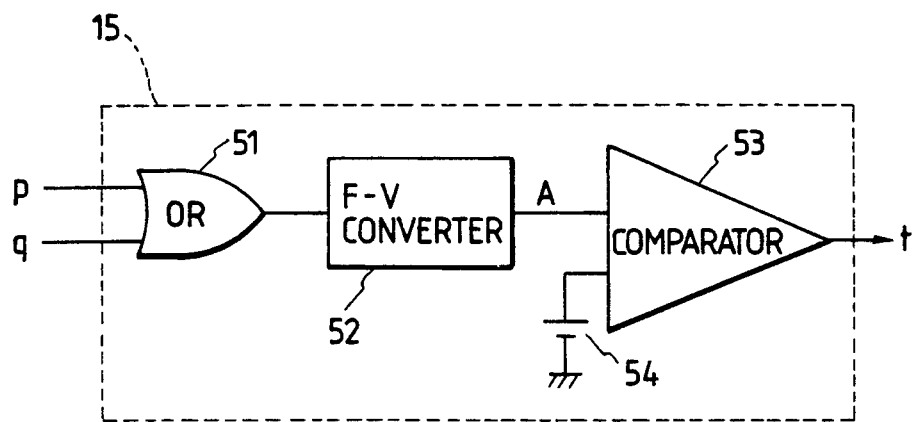
FIG. 6 is a block diagram of a speed detection circuit of the same embodiment.
Figure 7:
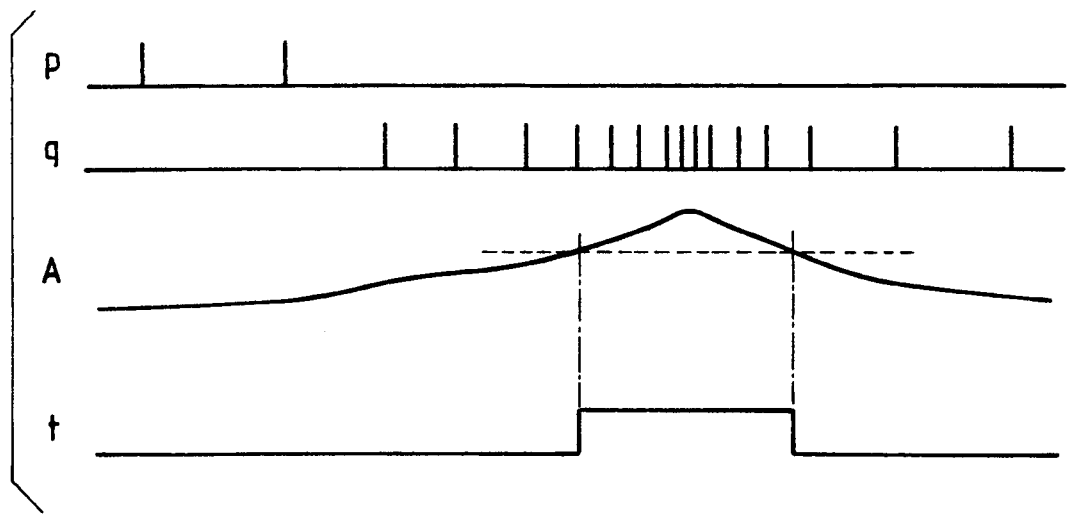
FIG. 7 is a time chart showing signal waveform examples on the same speed detection circuit.

FIG. 6 is a partial block diagram showing details of speed detection circuit 15 of the subject device. The reference numeral 51 in the figure is an OR circuit which outputs the logical add of two types of input signals while numeral 52 is an F-V converter that converts frequencies of input signals into voltage values. The reference numeral 53 denotes a comparator. The numeral 54 is a reference power source which assigns reference voltage to comparator 53. This reference voltage is at the same level with the voltage output from F-V converter 52 under the frequencies (namely, speed) at points (1) and (5) in FIG. 4. FIG. 7 shows the waveform examples of respective signals on the speed detection circuit 15. These examples in FIG. 7 also pertain to the case with gradual speed acceleration of the linear scale followed by gradual deceleration. With reference to this FIG. 7, the operation of the speed detection circuit will be explained as follows.

From the OR circuit 51, the logical add of up-down pulses "p" and "q" at the previous stage is obtained and the F-V converter 52 converts their frequencies to voltage values. Then, comparator 53 compares these voltage values with voltage levels from reference power source 54. When frequency level exceeds the frequency corresponding to the voltage from reference power source 54, output signals at high level are output. In this manner, achieved is output of detection output "t" under high frequency or low frequency (namely, high speed or low speed) as mentioned above.

The above explanation relates to the case of shifting the moving object in a predetermined direction. However, same operating principles are applicable to a movement in reverse direction.

On the above embodiment, more stable operation is achievable by providing certain delays on signal "u" or "v" and addition of such adjustment will not cause deviation from the spirit of the present invention.

In the said embodiment, explained is the case of 8 division of one cycle of sinusoidal wave signals entered into input terminals 1 and 2. However, by division in higher rates, similar configurations can be satisfied. Rather, it can be said that into the greater numbers the division is made, the more conspicuously the effects of this invention can be realized. It may also be possible to use the signals which divide signals "p" and "q" as signals "j" and "k" and conduct switching between these two types of signals. Further, as signals "p" and "q", but usable signal types are not limited to these examples with 4 division of input signals a, b. In other words, other signals can be equally used as long as those signals possess the resolution (¼ cycle) multiplied by integers obtainable from signals "f" and "h". As signals "p" and "q", use is also possible of the signals that do not divide input signals "a" and "b" (signals with same cycles with input signals "a" and "b"). Detection means of shift speed of moving objects are not limited to the above-mentioned method. However, it is desirable to adopt the configurations which allow switching with sufficient leeway to counting of signals before division at least against the ranges where divided signals become unreliable.

As explained up to this point, the circuit according to the present embodiment comprises a speed detection means for detecting changes of linear scale shift speed by using signals before or after division, and two counting means for counting of signal numbers before division and of signal numbers after division, respectively. When the scale shift speed is judged to be high speed by above-mentioned speed detection method, count results of signal after division are not used and instead, the results before division are employed. By adopting such circuit configurations, signal insertion circuits with high-speed response can be realized.

Figure 8B:
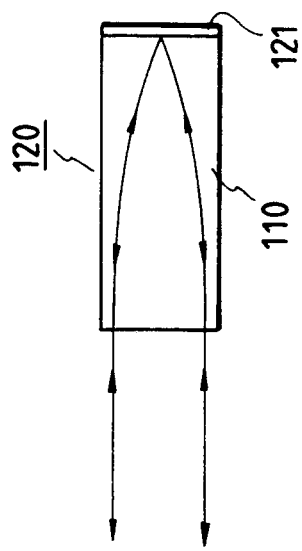
FIG. 8B is a schematic diagram of reflection elements used in the same displacement measuring device.
Figure 8A:
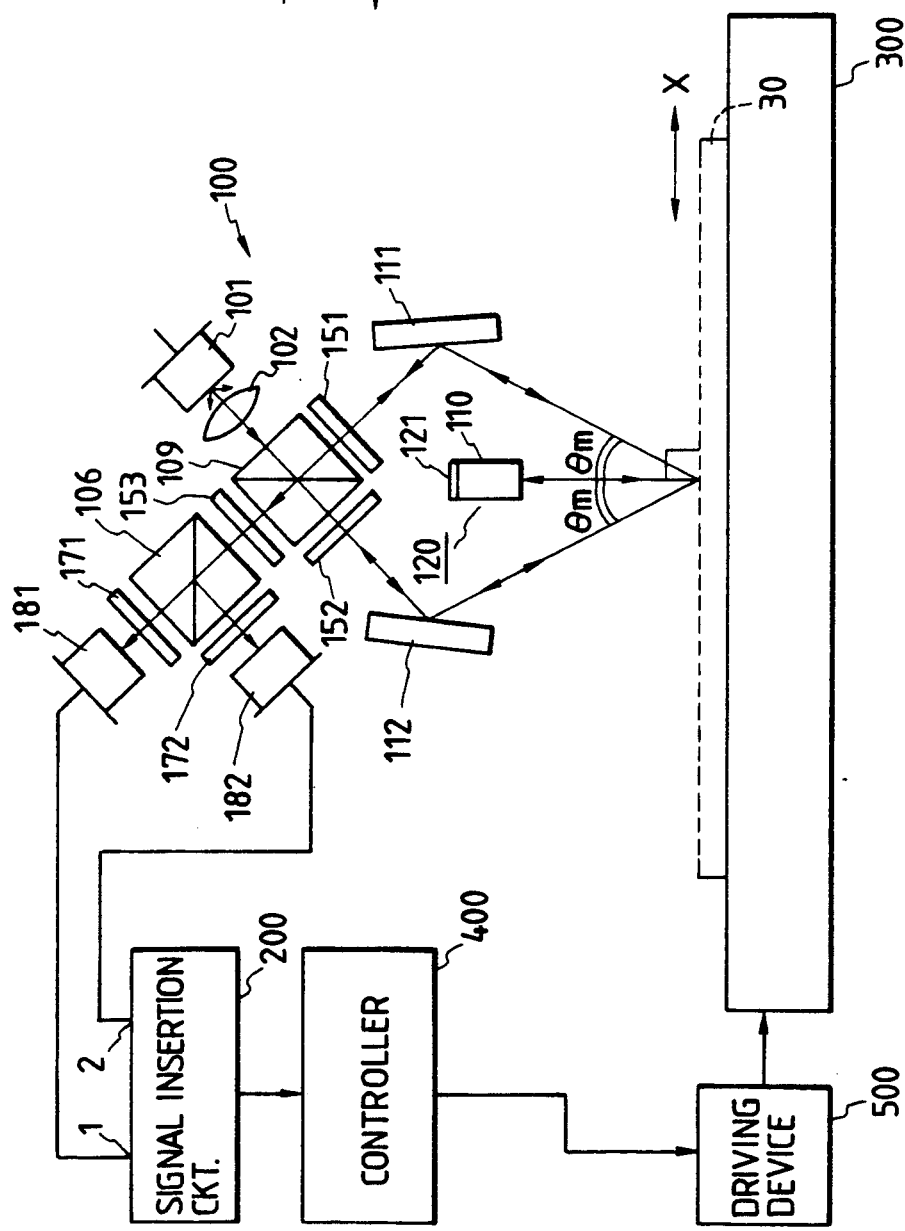
FIG. 8A is a overall schematic diagram of a displacement measuring device of the same embodiment.

FIG. 8A and 8B are the overall schematic diagrams of a displacement measuring device incorporating the above-mentioned signal insertion circuit. In this embodiment, cited is an example use of optical displacement measuring device for the purpose of wafer stage position measurement on an exposure device for semiconductor manufacturing. On the subsequently explained other embodiments, the signal insertion circuits are provided in the interior of displacement measuring devices.

Referring to FIG. 8A and 8B, the reference numeral 100 is a scale reader, 101 a semiconductor lazer, 102 a collimator lens, and 30 an optical scale. This optical scale 30 is mounted on wafer stage 300 and is provided with a diffraction grating with grating pitch "d", capable of moving in arrow "x" direction shown in the figure by speed "v". Wafer stage 300 is driven by a driving device 500. The reference numeral 109 is a deflection beam splitter, 151 and 152 are ¼ wavelength plate and 111 and 112 denote reflection mirrors. Further, 106 is a beam splitter while 171 and 172 and deflector plates with respectively orthogonal axes. These deflector plates 171 and 172 are arranged so that their deflection axes form 45-degree angles with the deflection axes of ¼ wavelength plates 151 and 152. 181 and 182 are light-receiving elements which perform photoelectric conversion of interferences.

The reference numeral 110 is a stick-shaped lens of refractive index distribution type possessing two-end flat surfaces for forming the light entering from one end surface into images on the other end surface. On one end of this lens, a reflection film 121 is coated. The lens 110 and reflection film 121 constitute a reflection element 120.

As will be explained later, the sinusoidal wave signals from light-receiving elements 181 and 182 mutually possess 90-degree phase difference. Signals with phase angle of 0° from light receiving element 181 are entered into the input terminal 1 of the signal insertion circuit 200 while signals with phase angle of 90° go from light-receiving element 182 into input terminal 2 of the signals insertion circuit 200. Signal insertion circuit 200, composed of the circuits shown in FIG. 3, counts the first up-down pulses formed by dividing (by inserting) the signals from light-receiving elements 181 and 182. Further, this circuit counts not only the first up-down pulses but also the second up-down pulses corresponding to the signals before division. By such counting of two types of up-down pulses, relative displacement of a wafer stage 300 against the device mainframe is measured. The measurement results are transmitted to a controller 400 and this controller 400 performs position control of the wafer stage 300 by way of a driving device 500. At this point, the shift speed of wafer stage 300 is increased and when frequencies of the signals from the light-receiving elements 181 and 182 rise above certain levels, input signals from the signal insertion circuit 200 to the controller 400 are switched from count results of the first up-down pulses to count results of the second up-down pulses. Further, when the shift speed of the wafer stage 300 is lowered to the contrary, input signal from the signal insertion circuit 200 to the controller 400 are switched from count results of the second up-down pulses to count results of the first up-down pulses.

In the present embodiment, interferable beams from the semiconductor laser 101 are made approximately parallel beams by the collimator lens 102 and these parallel beams are entered into the deflection beam splitter 109 for splitting into two types of beams, namely transmission beams of linear deflection (P deflection) and reflection beams of linear deflection (S deflection). In this case, installation position of the semiconductor laser 101 is properly adjusted so that linear deflection direction of emission beams from the semiconductor laser 101 forms 45-degree angle against deflection direction of the deflection beam splitter 109. By conducting such adjustment, the relation of approximately 1:1 is established on the intensity ratio between transmission beams and reflection beams from the deflection beam splitter 109.

The reflection beams and transmission beams from the deflection beam splitter 109 are subjected to circular deflection via the wavelength plates 151 and 152 and reflected with reflection mirrors 111 and 112. Then, diagonal incidence of reflected beams is made into optical scale 30. Further, respective beams are entered into optical scale 30 so that "m"-order diffraction light from target optical scale 30 can be emitted approximately perpendicularly from the diffraction grating surface of optical scale 30.

In other words, beam incidence is achieved in the manner to satisfy the following equation $$\theta m = \sin^{-1}(m\lambda/p) \quad \quad (1)$$

Where,
P: Grating pitch of diffraction grating of optical scale 30
$\lambda$: Wavelength of interferable beam from semiconductor laser 101
m : Integer
$\theta m$: Angle of incidence to diffraction grating surface of interferable beams (angle from perpendicular line to diffraction grating surface)

Reflection beams from deflection beams splitter 109 achieve diagonal incidence into optical scale 30 by angle of incidence of $\theta m$ and then reflection diffraction is performed by the diffraction grating of optical scale 30, followed by perpendicular emission of primary diffraction light from this scale. On the other hand, diagonal incidence of transmission beams from deflection beam splitter 109 into optical scale 30 is achieved by the angle of incidence of $-\theta m$ and reflection diffraction is performed by the diffraction grating of optical scale 30, resulting perpendicular emission of negative primary diffraction light. In this application example, incidence positions of refrection beams and transmission beams into optical scale 30 are made identical and therefore, a pair of diffraction lights ($\pm$primary) vertically ejecting from scale 30 are overlapped each other. Consequently, such reflected diffraction lights form mutually common optical paths. In this case, the optical paths for transmission beams and reflection beams from deflection beam splitter 109 as well as for reflected diffraction lights are included into the same incidence surface (surface parallel with paper).

$\pm$primary diffraction lights perpendicularly omitted from optical scale 30 are directed toward reflection element 120 and enter into the end surface of lens 110. This lens 110, a stick-shaped one, is provided with the predetermined length to permit the parallel lights entering into one end surface of the lens to form images on the other end surface. In other words, the focal point surface of element 120 is located on its end surface. On the other end surface, formed is reflection film 121. Therefore, $\pm$primary diffraction lights entering into lens 110 are reflected by reflection film 121 as shown in FIG. 8B, return to original optical paths, are emitted from lens 110, and then go into optional scale 30 again.

Then, $\pm$primary reflected diffraction lights, rediffracted by the diffraction grating of optical scale 30, return to the original optical paths, under reflection by reflection mirrors 111 and 112, and enter again into deflection beam splitter 109 after passing through $\frac{1}{4}$ wavelength plates 151 and 152.

At this time, the rediffracted lights have again passed through $\frac{1}{4}$ wavelength plated 151 and 152. Therefore, at the time of reincidence, the beams first reflected by deflection beam splittor 109 (S deflection) are in the status of P deflection with 90-degree different deflection direction against the splitter. Therefore, these first reflected beams now pass through deflection beam splitter 109. Reversely, the beam which first have passed through the splitter becomes S deflection and become reflected when the beams make reincidence into deflection beam splitter 109.

As explained above, two types of rediffracted lights are overlapped by deflection beam splitter 109 and such lights are converted to circular deflection lights with mutually reverse rotations by way of $\frac{1}{4}$ wavelength plate 153. The beam splitter 106 splits the lights into two types of beams and converts into linearly deflected lights via deflection plates 171 and 172. These linearly deflected lights finally enter into light-receiving elements 181 and 182 as interference light.

Angle of incidence $\theta m$ on Equation (1) mentioned above can be any values within the range which permits incidence of diffraction light into reflection element 20 and reincidence into optical scale 30.

In this application example, the phase of "m"order diffraction light is changed by $2m\pi$ per each 1-pitch shift of diffraction grating Therefore, light-receiving elements 181 and 182 perform photoelectric conversion by receiving the interference light subjected to interference by beams which undergo two times each of positive and negative "m"-order diffraction. Because of this reason, when the grating of diffraction grating is shifted by 1 pitch, 4m pieces of sinusoidal wave signals can be obtained.

Accordingly, 3.2 $\mu$m is used as the pitch of diffraction grating of optical scale 30 primary ("M"=1) is adopted as the diffraction light. As a result, when optical scale 30 is shifted by 3.2 $\mu$m, 4 pieces of sinusoidal wave signals can be obtained from lightreceiving elements 181 and 182. That is, as the resolution per each sinusoidal wave, obtainable is $\frac{1}{4}$ of the pitch of diffraction grating 30, namely 3.2/4=0.8 $\mu$m. By combining $\frac{1}{4}$ wavelength plates 151 and 152 as well as deflection plates 171 and 172, 90-degree phase is provided between output signals from light-receiving elements 181 and 182 so that discrimination of shift direction of diffraction grating 30 and signal insertion become possible. In this embodiment, by using common optical paths for ±primary diffraction lights emitted from optional scale 30, the lights are directed again toward this optical scale 30 by way of common reflection element 20. This means that because installation of individual reflection mirrors is not required for individual diffraction light, the device can be compact in its size and simple in its configurations. Also, by utilizing such benefits, ratios of stray light generation to reach to the light-receiving elements are reduced, thus contributing to improvement of detection accuracy of interference fringes.

Additionally, as shown in FIG. 8A, providing of the device composing components all at the upper side of optical scale 30 (one side) can be facilitated, thereby enabling offer of optical encoders extremely rich with general applicability.

Reflection element 120 mentioned in this embodiment is provided with the reflection surface in the neighborhood of focal point surface. Therefore, for instance, even feeble change of diffraction angle occurs due to oscillation wavelength variations of laser beam accompanying alteration of the angle of incidence into lens 110, diffraction light can be returned to optical scale 30 by way of approximately same optical paths. This capability permits securate overlapping of two type of, namely, positive and negative, diffraction lights consequently preventing degradation of S/N ratio of the output signals from light-receiving elements 181 and 182. Further, size reduction of entire device is attempted by presetting the angle of incidence 8m of laser beams into optical scale 30 as mentioned above concurrently by using reflection element 120.

If the grating pitch of diffraction grating of optical scale 30 is 3.2 μm and the wavelength of laser 101 is 0.78 μm the diffraction angle of ±primary diffraction lights is 14.2° as previously mentioned. Hence, when refraction-rate distribution-type lens with diameter of about 2 mm is used as lens 110 to reflect only ±primary diffraction lights, the distance from optical scale 30 to lens 110 becomes 2/tan 14.2° = 7.9 mm. In other words, separation of only about 8 mm is all that is mended and this advantage makes configurations of entire device highly compact.

Under the subject embodiment, the optical path lengths are identical for a pair of rediffracted lights which form interference fringes (single color) on light-receiving element 181 and 182. Therefore even if the wavelength of semiconductor laser 101 are changed, it is possible to generate the interference fringes that react only against displacement of optical scale 30. Also, what becomes possible is mounting of low-priced multimode semiconductor laser as a light-emitting element.

In this embodiment, as is comprehensible from FIG. 8, symmetry exists on the optical paths of optical system composed of deflection beam splitter 9, reflection mirrors 111 and 112, and reflection element 120. This fact makes the system configurations resistant against external disturbance of optical scale 30 by vertical movement and others.

The signal insertion circuit in the first embodiment explained up to this point comprises a division means for dividing original signals and generating preliminarily determined plural numbers of pulses, a first count means for counting said plural numbers of pulses, a second count means for counting designated pulses corresponding to the original signal, and a control means for controlling counting operation of said the first and the second counting means in compliance with frequencies of said original signals. By adopting this configurations of this type, even when original-signal frequencies are elevated and the division means fails to achieve accurate generation of divided pulses, the control means enables the use of count results by the second count means in lieu of the results by the first count means. Consequently, for instance, by applying the circuit linear encoders or other devices, scale displacement can be constantly measured regardless of the speed variation of linear scales.

The displacement measuring device according to the present embodiment comprising a scale reading means that outputs signals in compliance with scale displacement levels by reading the scale graduations provided on the movable scale, a division means that divides signals from said first scale reading means and generates plural pulses of predetermined numbers, and a first count means that counts the numbers of these plural pulses, further comprises a second count means that counts pulses corresponding to signals from said sale reading means, and a control means that controls the counting operation of said first and second count means in line with variations of frequencies of signals from said scale reading means, thereby enabling the measurement of scale displacement from the results of said second count means even when scale shift speed (parallel shift or rotation) varies and frequencies of signals from the scale reading means are increased. Also provided is a displacement measuring device according to the present embodiment which comprises a scale reading means that reads the graduations on the movable scale and issures signals pursuant to the scale displacement, a pulse generating means that creates first pulses of predetermined frequencies and second pulses of frequencies lower (greater pitches) than said first pulses based on signals from the scale reading means, measurement means that counts said first and second pulses and measures displacement of the scale, and control means that controls said measurement means based on the shift speed variations of the scale. By adopting the configurations of this type, similarly to the above-mentioned device, scale displacement can be measured by the measurement means irrespective of the scale shift speed. Moreover, the measurement method can be selected depending on the scale shift speed. For instance, in case of high speed, measurement is made by counting the second pulses and in case of low speed, measurement is achieved by counting the first pulses. This measurement method selection can be made either per each target scale or according to shift speed changes during measurement of one of the scales.

Figure 9:
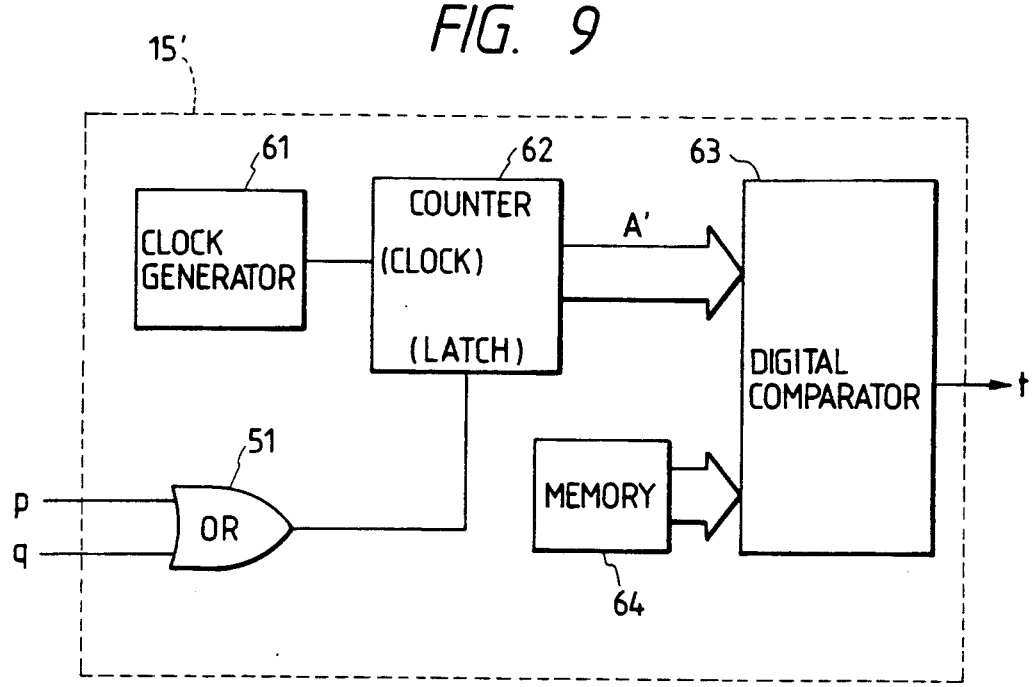
FIG. 9 is a block diagram showing a speed detection circuit of the second embodiemnt.
Figure 10:
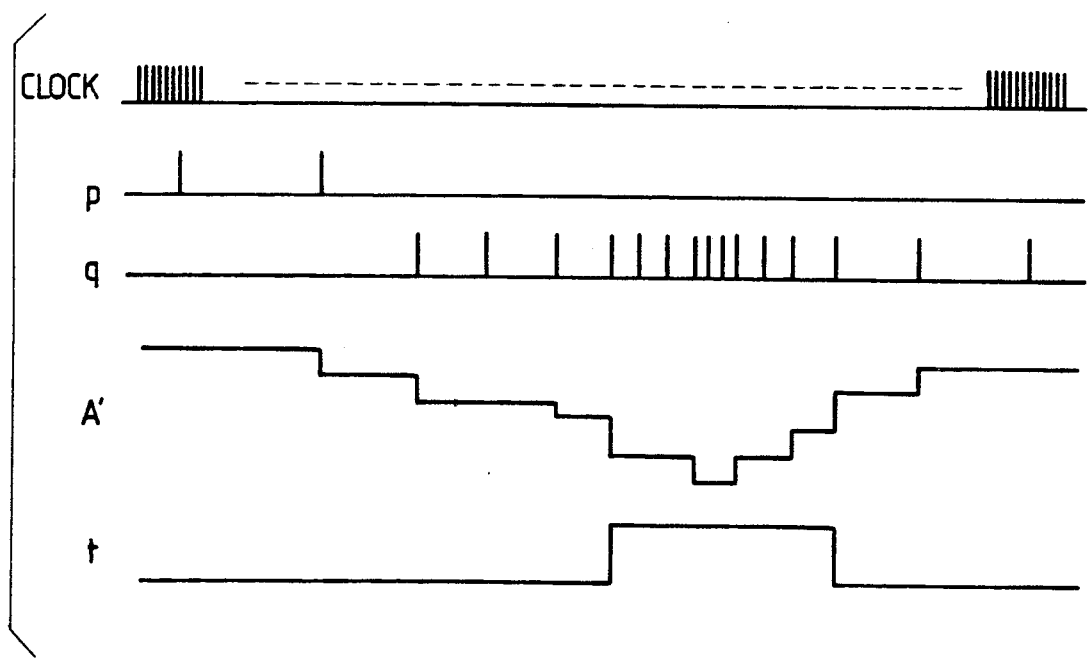
FIG. 10 is a time chart showing respective signal waveform examples of the same speed detection circuit.

Now, FIGS. 9 and 10 are referred for explanations of the second embodiment of the subject invention. FIG. 9 is a partial block diagram of a speed detection circuit 15' of the displacement measuring device in the second embodiment of this invention. On the second embodiment, the speed detection circuit is the only portion that differs from the configurations in the first embodiment. Since all other components are the same as those of the first embodiment, explanations and drawings are omitted herein. Pertaining to FIG. 9, reference numeral 61 is a clock generating circuits, 62 a counter, and 63 a digital comparator. Reference numeral 64 is a memory device and this memory device stores as reference data the data same as count output from the counter under frequencies (namely, speed) at points (1) and (5) in previous FIG. 4. An OR circuit 51 is identical with that shown in FIG. 6.

FIG. 10 shows the waveform examples of respective signals on speed detection circuit 15'. This FIG. 10 also reveals an example case where the speed is first gradually increased and then gradually decreased. From this figure, the operation of speed detection circuit can be explained as follows.

At OR circuit 51, obtained is the logical add of up-down pulses "p" and "q" from the preceding stage. Clock generating circuit 61 generates clocks with frequencies sufficiently higher than "p" and "q" and these clocks are directed to counter 61 for counting. Each time the logical add pulsed of "p" and "q" is received, counter 62 latches these pulses, outputs clock count data, and clears the data. The digital comparator compares this count data with the reference data stored in memory device 64 and performs high-level output of output signal E at count values smaller than the reference data (namely, at high frequencies). (Signal A shown in FIG. 10 is actually digital data of plural bits.) In this manner, as mentioned above, detection output of high frequencies and low frequencies (namely, high speed and low speed) is achieved.

Figure 11:
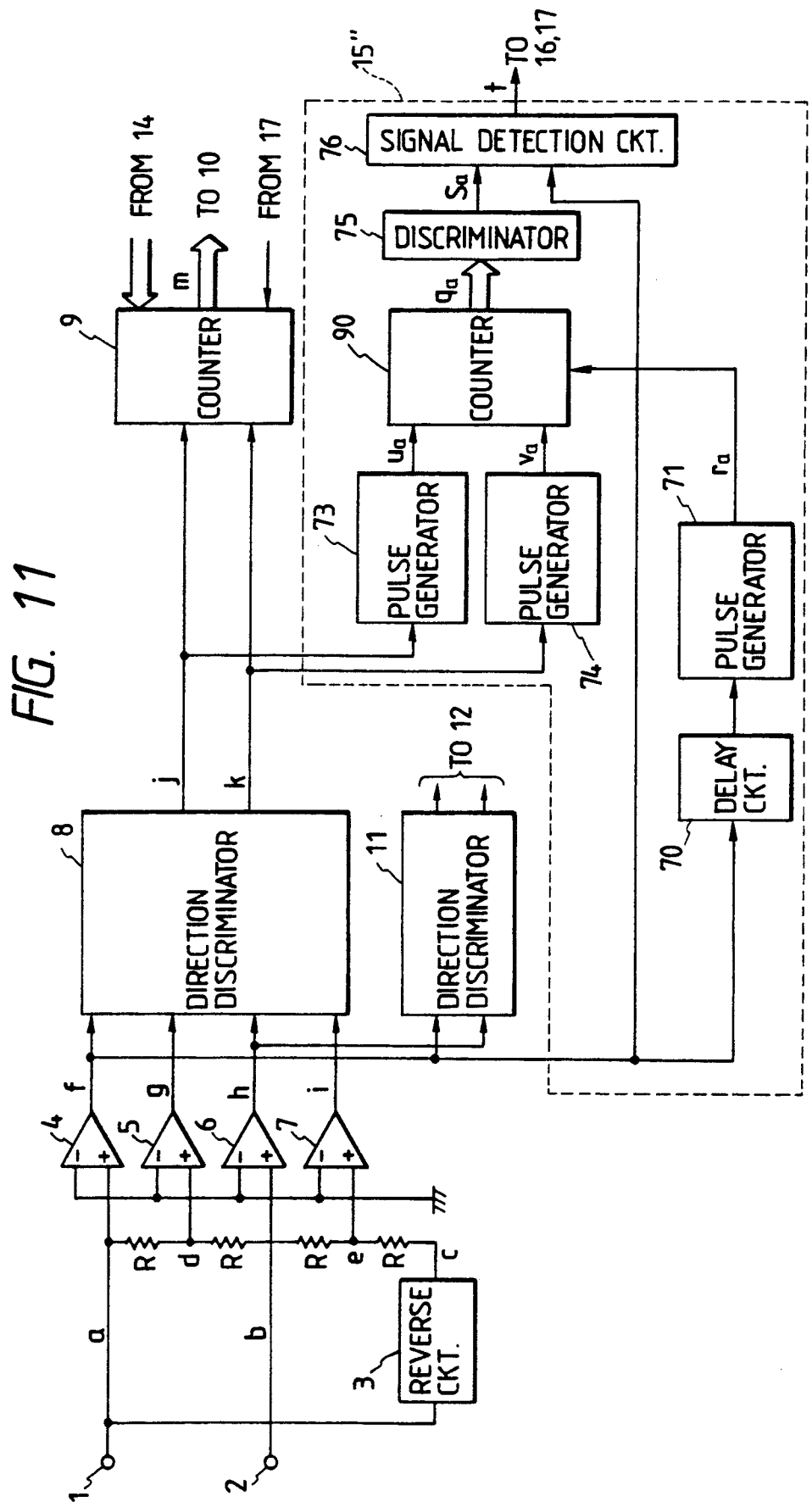
FIG. 11 is a block diagram showing a signal insertion circuit of the third embodiment according to the present invention.

FIG. 11 is a block diagram showing the signal insertion circuit used in the third embodiment of this invention. On those components identical with those shown in FIG. 3, the same symbols and numbers are affixed. Therefore, explanations on the identical components are omitted or explanations will be limited to those which require clarifications. In this third embodiment, the speed detection circuit 15' is indicated in place of the speed detection circuit 15 shown in the first embodiment.

The reference numerals 73 and 74 are pulse generating circuits of single stable multivibrator or others that can be retriggered, capable of generating up-down pulses "ua" and "va" with widths wider than divided pulses "j" and "k". Reference numeral 90 is a counter which counts up-down pulses "ua" and "va" with wide widths from pulse generating circuits 73 and 74 and outputs count data "qa". The numeral 70 is a delay circuit which assigns certain delay D to signal "f" corresponding to original signal before division. The numeral 71 is a pulse generator made of single stable multivibrator or others and this circuit generates pulse "ra" with predetermined time width in response to rise edge of signal "f" with delay D from delay circuit 70. This pulse "ra" is used as the reset signal of counter 90. Numeral 75 is a discriminator circuit designed for judging whether or not count data "qa" from counter 72 coincides with division number N preliminarily determined by this circuit. Configurations of this circuit allow its output "sa" to become H (high level/logic 1) only when the said coincidence exists. Numeral 76 is a detection signal circuit which outputs the signals (detection output "t" that become H (high level) during one cycle period of signal "f" when H signal is not received from discriminator circuit 75. All these circuits explained above constitute signal detection circuit 15".

Figure 12:
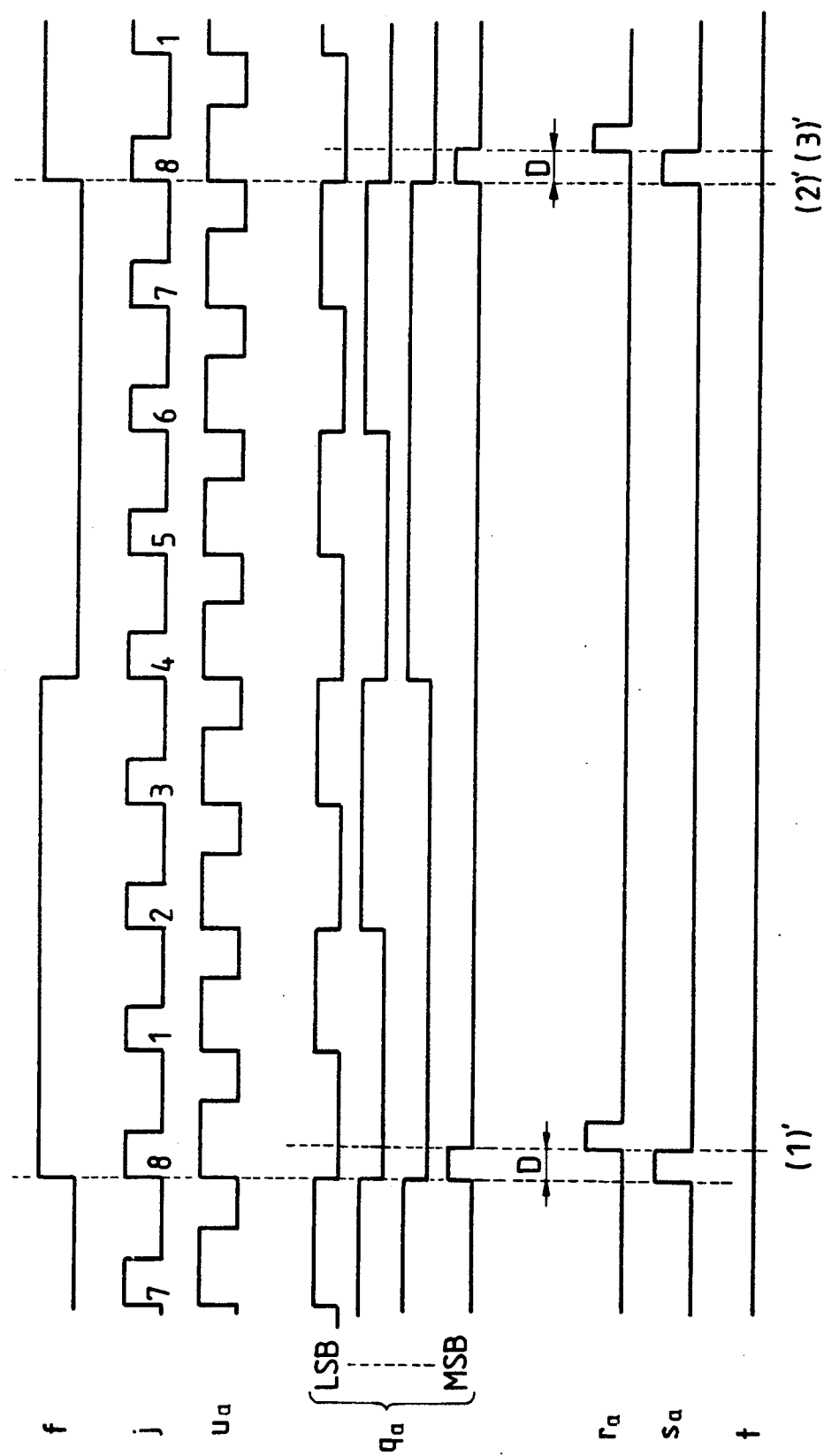
FIGS. 12 and 13 are time charts showing waveform examples for explanation of operation in the same embodiment.

By referring to the signal waveform examples shown in FIG. 12, explanations will be made on the circuit operation of FIG. 11. The circuits in FIG. 11 perform, similarly to the circuits in FIG. 3, 8 division of one cycle of input signals (original signals). Count data "qa" is reset at point (1') (at rise of signal "f") and counter 90 counts up at each rise edge of signal "us". Therefore, unless erroneous operation occurs on the circuits up to direction discriminator 8, count data "qa" becomes 8 (binary and 1.0.0.0 from upper bit) at next rise point (2') of signal "f". At this time, discriminator circuit 75 judges that data "qa" is coincided with division number N (N<8) and from that point on, output "sa" becomes H. At point (3') with lapse of short time D from point (2'), counter 90 is reset by signal "ra" and simultaneously output "sa"

discriminator circuit 75 becomes L (low level/logic 0). In the present embodiment, correct performance of 8 division is confirmed by the fact that signal "sa" becomes H immediately after rise edge of signal "f". By using this discriminator circuit 75, various processing can be performed. Output from discriminator circuit 75 is sent to detection signal circuit 76 which issues L output because signal "sa" is H at rise of signal "f". This way, while correct performance of 8 division is being confirmed, detection signal circuit 76 continues L output.

Next, by referring to the example shown in FIG. 13, explanations will be made regarding the case where (slightly before) separation of division pulses from direction discriminator 8 becomes not possible due to rise of frequencies of sinusoidal wave signals (phase angles 0°, 90°) entered into input terminals 1 and 2. Count data "qa" is reset at point (1') of FIG. 13 (during rise of signal "f") and continues count-up at each rise edge of signal "us". On the example shown in FIG. 13, pulse array cycles are varied from 3rd through 6th pulse and separation is not possible between 3rd and 4th pulses as well as 5th and 6th pulses (marked with Δ). As a result, at the next rise of signal "f", namely, point (2'), count data "ga" becomes 6 (0.1.1.0 from upper bit). At this time, since data "qa" does not correspond with division number N (N≦8) at discriminator circuit 75, output "sa" remains L. Because signal "sa" is L during rise of signal "f", detection signal circuits 76 issues H output for one cycle period of signal "f". If signal "sa" still remains at L at the next rise edge of signal "f", the circuit continues output H for another one cycle period of signal "f". Detection signal circuit 76 keeps issuance of output H in this way as long as there exists probability of failure in correct performance of 8 division.

Figure 13:
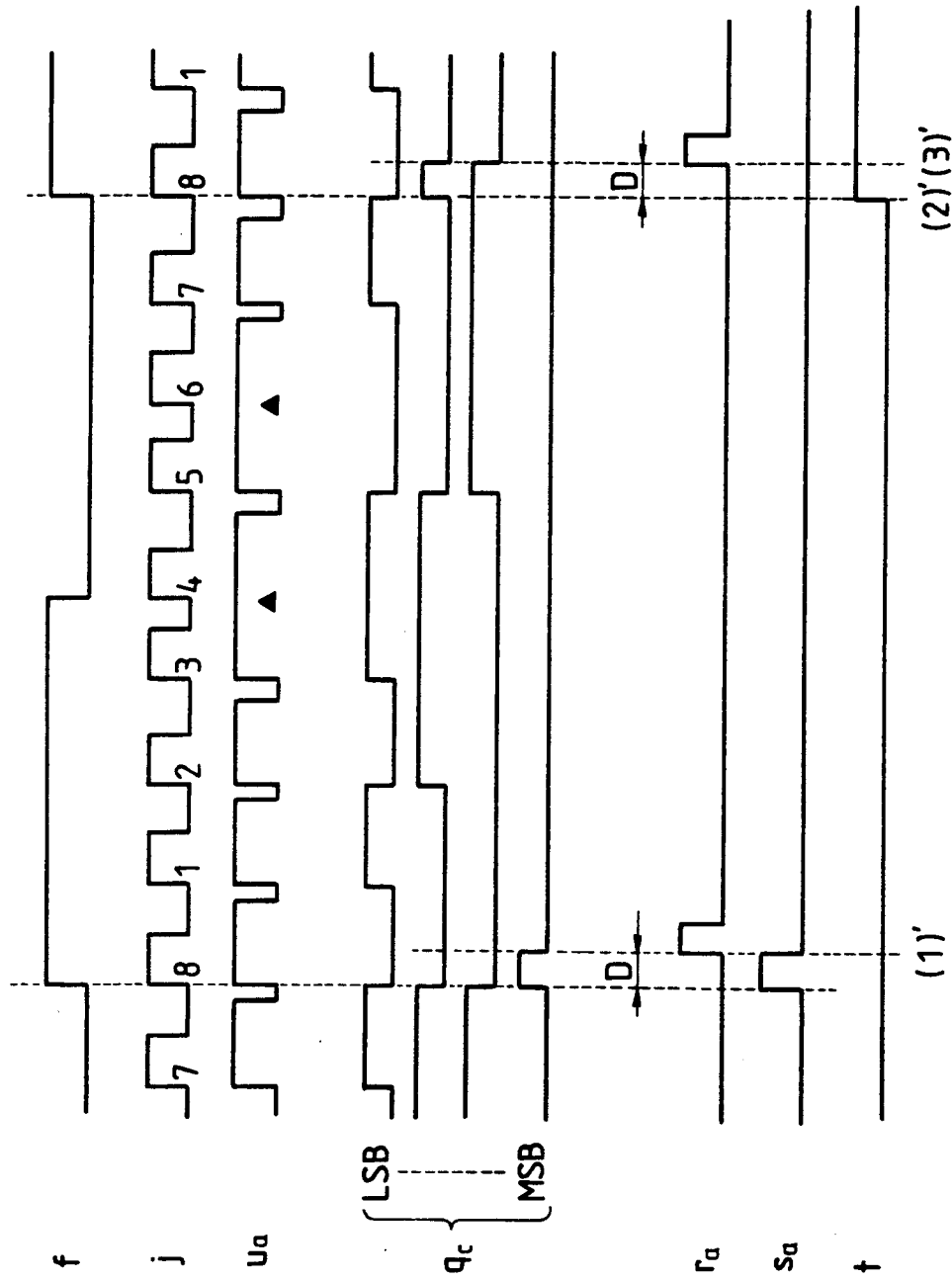

As mentioned above, by checking whether signal "sa" immediately after rise edge of signal "f" is at H or L, it is possible to know if correct division is made on pulses "ua" and "va" generated in response to pulses "j" and "k" shown in FIG. 13, even when separation of pulse "ua" (or "va") starts to become difficult, separation is still possible although pulse cycle variation occurs because widths of split pulses "j" and "k" are narrower. Therefore, correct count values are obtainable at output "m" of counter 9. Thus, further accurate, error-free counting becomes possible by conducting prompt switching through estimating operating trouble before division failure actually occurs. The above-mentioned detection output "t" is sent to latch circuit 16 and pulse generating circuit 17 shown in FIG. 3. By conducting the processes also shown in FIG. 3, cases of division failure (for instance, high speed, namely high frequency) can be properly prevented. In other words, by switching to low-resolution counting of larger-pitch pulses, counting can be smoothly continued.

In the above embodiment, indicated is an example case of relatively short-time delay D of signal "f" created by delay circuit 70. Basically, however, setting of this delay will suffice as long as reset operation of counter 90 can be completed before rise of pulse signal subsequent to up-down pulse "ua" (or "va").

In the above embodiment, to detect erroneous operation of the division steps (1–8), counter 9 counts the number of split pulse ("ua", "va") within the period corresponding to one cycle of signal "f". This counting period does not need to be limited to one cycle period of signal. The counting period may be any other lengths as long as the period is integer multiplication of resolution (¼ cycle) obtained from signals "f" and "h".

Further, methods other than those explained above can also be applied to judgment on coincidence between count value "qa" and division number N or to styles of signals for indicating judgment results.

Figure 14:
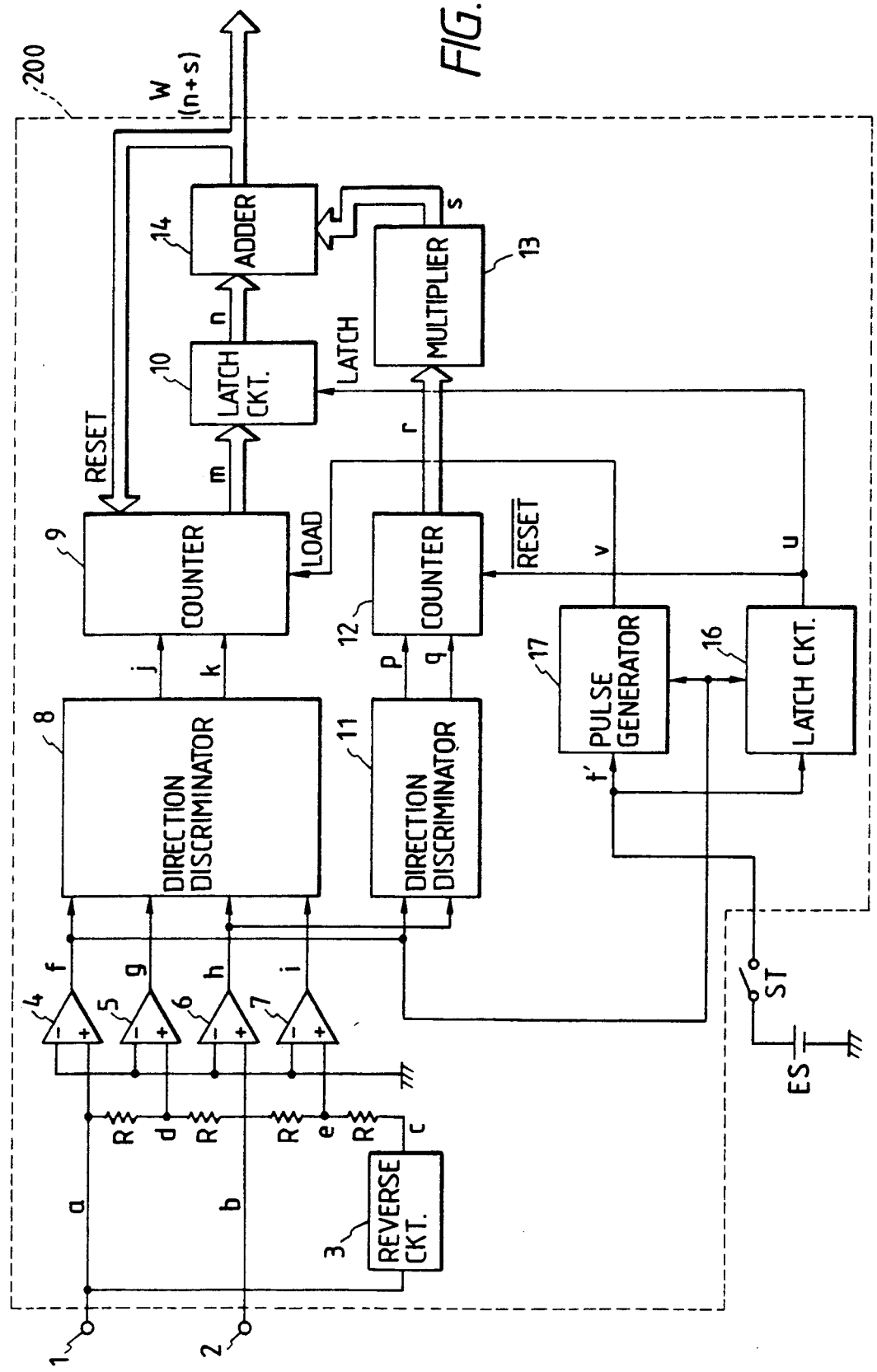
FIG. 14 is a block diagram of a signal insertion circuit of the fourth embodiment according to the present invention.

FIG. 14 will be used for explaining the fourth embodiment of this invention. This fourth embodiment differs from the first embodiment on the points that speed detection circuit 15 is not provided and counting change is made by switching of swith ST. Other components are indentical with those of the first embodiment and therefore, explanations are omitted. ES is a power supply unit for generating output t' and this power supply outputs H (high level) output to latch circuit 16 and pulse generating circuit 17 when switch ST is turned ON. Switch ST is preliminarily turned ON by the operator before measurement, for example, in faster speed. Or, this switch is turned ON by command signal sent from the speed measuring device when high-speed displacement is judged by the speed measuring device installed separately from the subject displacement measuring device. When switch ST is turned ON and output t' of H is assigned or when switch ST is turned OFF and output t' of L is assigned, the device operation is identical with the first embodiment. Explanations on this point are therefore omitted.

On the embodiment explained up to this point, the displacement measuring device for position measurement of wafer stage is indicated. This displacement measuring device can be effectively used, for example, for position measurement of magnetic heads or optical heads for formation of tracking tracks on magnetic disks or optical disks. Also, the device is applicable to encoders of magnetic, optical linear, rotary, and various other types.

As mentioned above, the means are provided for counting the first pulses and the second pulses with mutually differing frequencies and the employed configurations allow controls of counting operation of these pulses. Therefore, even when frequencies become high and, for instance, the first pulses generated by dividing original signals become inaccurate due to high frequencies of original signals, it is possible to conduct accurate signal processing by using the second pulses corresponding to original signals with lower frequencies (larger pitches). Consequently, regardless of the scale shift speed, the displacement measuring device to perform displacement measurement can be offered.

Further, pulse signals with two types of pitches can be formed from the same input signals and complete synchronization can be achieved between these two types of pulses. Then by conducting switching between these types of pulses, and advantage can be created for eliminating counting errors arising from synchronizing errors of both pulse signals during switching.

I claim:

1. A pulse counting circuit for counting pulse signals, comprising:
    a pulse signal generating means for generating first and second pulse signals by dividing an input periodic signal into first and second multiple pulse divisions, said first pulse signal having divisions greater than those of said second pulse signal;
    a counting means for counting at least either of said first pulse signal and said second pulse signal; and
    a control means for selectively controlling an operation of said counting means for effecting counting of said first and second pulse signals.

2. A circuit according to claim 1, wherein said input periodic signal comprises 2-phase sinusoidal wave signals.

3. A circuit according to claim 2, further comprising a frequency change detecting means for detecting changes of frequencies of said periodic signals.

4. A circuit according to claim 3, wherein said control means controls said counting operation based on detection results of said frequency change detecting means.

5. A circuit according to claim 4, wherein said control means directs said counting means to count said first pulse signals when frequencies of said periodic signals are lower than predetermined values, and switches pulse signals counted by said counting means from said first pulse signals to said second pulse signals when frequencies of said periodic signals are higher than predetermined values.

6. A circuit according to claim 1, wherein said control means directs said counting means to count either of said first and second pulse signals based on command signals received from the exterior.

7. A circuit according to claim 1, further comprising abnormality detecting means for detecting abnormality in counting of the first pulse signals by said counting means.

8. A circuit according to claim 7, wherein said control means directs said counting means to count said first pulse signals under the state where abnormality is not detected by said detecting means, and switches pulse signals counted by said counting means from said first pulse signals to said second pulse signals.

9. A displacement measuring device for measuring relative displacement of objects that undergo relative shift, comprising:
    a scale provided on one side of two objects;
    a scale reading means for reading said scale, said scale reading means being provided on the side differing from said one side;
    a first pulse signal generating means for generating a first pulse signal of a first frequency corresponding to reading results of said scale reading means;
    a second pulse signal generating means for generating a second pulse signal of a second frequency corresponding to reading results of said scale reading means, said second frequency is lower than said first frequency;
    a counting means for counting at least either of said first and second pulse signals:
    a control means for selectively controlling the counting operation of said first and second pulse signals by said counting means; and
    a displacement detecting means for detecting relative displacement of two objects based on counting results of said counting means.

10. A device according to claim 9, further comprising a frequency change detecting means for detecting frequency changes of output signals by said scale reading means.

11. A device according to claim 10, wherein said control means controls said counting operation based on a detection results by said frequency change detecting means.

12. A device according to claim 11, wherein said control means directs said counting means to count said first pulse signals when frequencies of said output signals are lower than predetermined values, and switches pulse signals counted by said counting means from said first pulse signals to said second pulse signals when frequencies of said output signals become higher than predetermined values.

13. A device according to claim 9, wherein said control means directs said counting means to count either said first or second pulse signals based on the command signals received from exterior.

14. A device according to claim 9, further comprising an abnormality detecting means for detecting abnormality in counting the first pulse signals by said counting means.

15. A device according to claim 14, wherein said control means directs said counting means to count said first pulse signals when abnormality is not detected by said abnormality detecting means, and switches pulse signals counted by said counting means from said first pulse signals to said second signals when abnormality is detected by said abnormality detecting means.

16. A device according to claim 9, further comprising a speed detecting means for detecting changes of relative displacement speed of two objects.

17. A device according to claim 16, wherein said control means controls said counting operation based on the detection results of said speed change detecting means.

18. A device according to claim 17, wherein said control means directs said count means to count said first pulse signals when relative displacement speed of two objects is smaller than predetermined values, and switches pulse signals counted by counting means from said first pulse signals to said second pulse signals when the relative displacement speed of two objects becomes greater than predetermined values.

19. A device according to claim 9, wherein said scale has a diffraction grating.

20. A device according to claim 19, wherein said scale reading means includes a light source means for irradiating light beams to said diffraction grating, and a light detecting means for detecting interference light of diffraction light from the diffraction grating irradiated by said light source means.

21. A device according to claim 20, wherein said scale reading means further includes a beam splitter for splitting into two the beams emitted from said light source function, and a light deflecting means for directing two beams split by said beam splitter for irradiation to substantially the same position of said diffraction grating, said light detecting means detecting interference light of diffraction lights emitted to substantially the same direction from said a substantially the same location said two beams.

22. A device according to claim 9, wherein said reading results comprise 2-phase sinusoidal wave signals.

23. A device according to claim 22, further comprising, means for judging a direction of the relative displacement from said reading results.

24. A stage device, comprising:
a stage relatively displaceable to a main body of said device;
a scale provided on one side of either said stage or said main body of said device;
a scale reading means provided on a side differing from said one side of either said stage or said main body of said device;
a first pulse signal generating means for generating a first pulse signal of a first frequency corresponding to reading results of said scale reading means;
a second pulse signal generating means for generating a second pulse signal with a second frequency corresponding to reading results of said scale reading means, said second frequency being lower than said first frequency;
a counting means for counting at least either of said first and second pulse signals;
a counting control means for selectively controlling the counting operation of said first and second pulse signals by said counting means;
a displacement detecting means for detecting relative displacement of said stage and device main body based on the counting results of said counting means; and
a displacement control means for controlling relative displacement between said stage and device main body based on the detection results of said displacement detecting means.

25. A device according to claim 24, wherein said reading results comprise 2-phase sinusoidal wave signals.

* * * * *

UNITED STATES PATENT AND TRADEMARK OFFICE
CERTIFICATE OF CORRECTION

PATENT NO. : 5,127,035
DATED : June 30, 1992
INVENTOR(S) : SATOSHI ISHII

Page 1 of 4

It is certified that error appears in the above-identified patent and that said Letters Patent is hereby corrected as shown below: Title page:

AT [56] REFERENCES CITED

U.S. Patent Documents,
        "Loed et al." should read --Loeb et al.--.

COLUMN 1

Line 9, "are" should read --is--.

COLUMN 2

Line 10, "a" should read --an--.
    Line 54, "Similarly" should read --Similar--.

COLUMN 3

Line 5, "similarly" should read --similar--.

COLUMN 6

Line 22, "lazer," should read --laser,--.
    Line 30, "plate" should read --plates--.
    Line 31, "and" (second occurrence) should read --are--.
    Line 52, "nals" should read --nal--.

UNITED STATES PATENT AND TRADEMARK OFFICE
CERTIFICATE OF CORRECTION

PATENT NO. : 5,127,035
DATED : June 30, 1992
INVENTOR(S) : SATOSHI ISHII

Page 2 of 4

It is certified that error appears in the above-identified patent and that said Letters Patent is hereby corrected as shown below:

COLUMN 7

Line 41, "P:" should read --p:--.
Line 48, "beams splitter 109" should read --beam splitter 109--.
Line 59, "resulting" should read --resulting in--.
Line 61, refrection beams" should read --reflection beams--.
Line 64, "overlapped" should read --overlapped with--.

COLUMN 8

Line 25, "splittor" should read --splitter--.
Line 42, "on" should read --in--.
Line 44, "element 20" should read --element 120--.
Line 48, "grating" should read --grating.--.
Line 57, "30 primary" should read --30 and primary--.
Line 60, "lightreceiving" should read --light-receiving--.

COLUMN 9

Line 2, "optional scale" should read --optical scale--.
Line 20, "even" should read --even if--.
Line 25, "securate" should read --secure-- and "type" should read --types--.
Line 30, "8m" should read --θm--.
Line 55, "beam splitter 9," should read --beam splitter 109,--.

UNITED STATES PATENT AND TRADEMARK OFFICE
CERTIFICATE OF CORRECTION

PATENT NO. : 5,127,035
DATED : June 30, 1992
INVENTOR(S) : SATOSHI ISHII

It is certified that error appears in the above-identified patent and that said Letters Patent is hereby corrected as shown below:

COLUMN 10

Line 20, "sale" should read --scale--.
    Line 28, "increassed." should read --increased.--.
    Line 32, "issures" should read --issues--.
    Line 62, "circuits," should read --circuit,--.

COLUMN 11

Line 12, "pulsed" should read --pulses--.

COLUMN 12

Line 6, ""sa"" should read --"sa" from-- and close up right margin.
    Line 7, Close up left margin.
    Line 27, "pulse" should read --pulses--.

COLUMN 13

Line 17, "swith ST." should read --switch ST.--.
    Line 41, "optical linear," should read --optical, linear,--.
    Line 60, "and" should read --an--.

COLUMN 14

Line 56, "signals:" should read --signals;--.

COLUMN 15

Line 1, "a" should be deleted.

UNITED STATES PATENT AND TRADEMARK OFFICE
CERTIFICATE OF CORRECTION

PATENT NO. : 5,127,035
DATED : June 30, 1992
INVENTOR(S) : SATOSHI ISHII

It is certified that error appears in the above-identified patent and that said Letters Patent is hereby corrected as shown below:

<u>COLUMN 16</u>

Line 4, "source function," should read --source means,--.
    Line 10, "location" should read --position of--.
    Line 14, "ing," should read --ing--.

Signed and Sealed this

Twenty-eighth Day of September, 1993

Attest:

BRUCE LEHMAN

*Attesting Officer*  *Commissioner of Patents and Trademarks*